US012707016B2

(12) United States Patent
Hori et al.

(10) Patent No.: US 12,707,016 B2
(45) Date of Patent: Aug. 11, 2026

(54) READING APPARATUS

(71) Applicant: BROTHER KOGYO KABUSHIKI KAISHA, Nagoya (JP)

(72) Inventors: Toshikazu Hori, Nagoya (JP); Satoshi Matsushita, Nagoya (JP); Hiroya Nojiri, Nagoya (JP); Satoru Yanagi, Obu (JP); Tomomi Shiraki, Nagoya (JP); Akihito Uno, Iwakura (JP); Taiga Mizumori, Nagoya (JP); Daisuke Matsumoto, Nagoya (JP); Toshiki Motoyama, Konan (JP); Thanh Nguyenvan, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 302 days.

(21) Appl. No.: 18/643,305

(22) Filed: Apr. 23, 2024

(65) Prior Publication Data

US 2024/0364833 A1 Oct. 31, 2024

(30) Foreign Application Priority Data

Apr. 27, 2023 (JP) ................................ 2023-073696
Apr. 27, 2023 (JP) ................................ 2023-073697

(51) Int. Cl.
*H04N 1/44* (2006.01)
*H04N 1/00* (2006.01)

(52) U.S. Cl.
CPC ....... *H04N 1/4433* (2013.01); *H04N 1/00413* (2013.01); *H04N 1/00811* (2013.01); *H04N 2201/0081* (2013.01)

(58) Field of Classification Search
CPC ............. H04N 1/4433; H04N 1/00413; H04N 1/00811; H04N 2201/0081
See application file for complete search history.

(56) References Cited

U.S. PATENT DOCUMENTS

2006/0271675 A1* 11/2006 Wakazono ......... H04N 1/00222 709/224
2014/0002840 A1 1/2014 Takano

FOREIGN PATENT DOCUMENTS

JP 2014-030182 A 2/2014

* cited by examiner

*Primary Examiner* — Christopher Wait
(74) *Attorney, Agent, or Firm* — Scully, Scott, Murphy & Presser, P.C.

(57) ABSTRACT

A reading apparatus includes a user interface, a scanner, and a controller configured to perform a push scan that causes the scanner to read a document according to an execution instruction corresponding to an operation on the user interface, and a pull scan that causes the scanner to read the document according to an execution instruction from an external device. The controller is configured to set a restriction setting value relating to a restriction on the push scan, and in a case where the controller receives an execution instruction of the push scan via the user interface, restrict the push scan according to the restriction setting value. In a case where the controller receives an execution instruction of the pull scan, the controller is configured to specify whether authentication is necessary with respect to the execution instruction of the push scan, based on the restriction setting value.

12 Claims, 9 Drawing Sheets

| User Restriction Function | Secure Function Lock: ON (19A) |
|---|---|
| Public Mode | Print: PERMITTED<br>Copy: PERMITTED<br>Scan: RESTRICTED<br>Fax(Send): PERMITTED<br>Fax(Receive): PERMITTED<br>USB(Direct Print): PERMITTED<br>USB(Scan to USB): PERMITTED<br>Web Connect(Upload): PERMITTED<br>Web Connect(Download): PERMITTED<br>⋮ (19B) |
| USER A | Print: PERMITTED<br>Copy: PERMITTED<br>Scan: RESTRICTED<br>Fax(Send): PERMITTED<br>Fax(Receive): PERMITTED<br>USB(Direct Print): PERMITTED<br>USB(Scan to USB): PERMITTED<br>Web Connect(Upload): PERMITTED<br>Web Connect(Download): PERMITTED<br>⋮ (19C) |
| USER B | Print: PERMITTED<br>Copy: PERMITTED<br>Scan: PERMITTED<br>Fax(Send): PERMITTED<br>Fax(Receive): PERMITTED<br>USB(Direct Print): PERMITTED<br>USB(Scan to USB): PERMITTED<br>Web Connect(Upload): PERMITTED<br>Web Connect(Download): PERMITTED<br>⋮ (19D) |

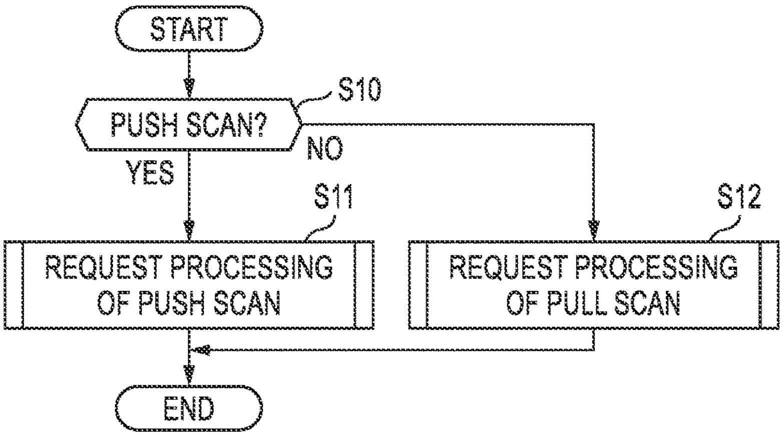

FIG. 6

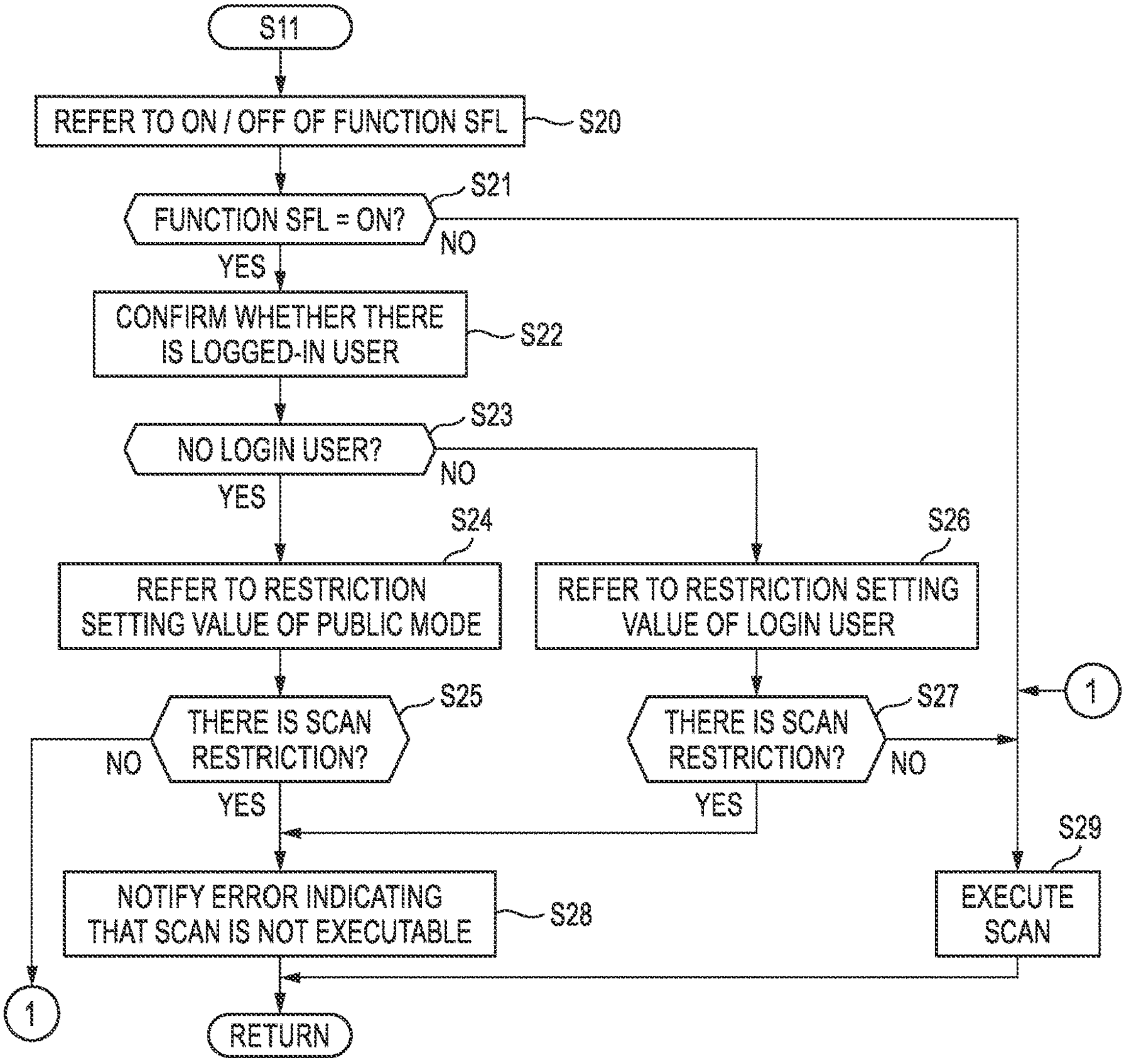

FIG. 7

S11
REFER TO ON / OFF OF FUNCTION SFL
S20
S21
FUNCTION SFL = ON?
NO
YES
CONFIRM WHETHER THERE IS LOGGED-IN USER
S22
S23
NO LOGIN USER?
NO
YES
S24
S26
REFER TO RESTRICTION SETTING VALUE OF PUBLIC MODE
REFER TO RESTRICTION SETTING VALUE OF LOGIN USER
1
S25
THERE IS SCAN RESTRICTION?
S27
THERE IS SCAN RESTRICTION?
NO
NO
YES
YES
S29
NOTIFY ERROR INDICATING THAT SCAN IS NOT EXECUTABLE
S28
EXECUTE SCAN
1
RETURN

READING APPARATUS

REFERENCE TO RELATED APPLICATIONS

This application claims priority from Japanese Patent Application No. 2023-073696 filed on Apr. 27, 2023 and Japanese Patent Application No. 2023-073697 filed on Apr. 27, 2023. The entire content of the priority application is incorporated herein by reference.

BACKGROUND ART

A related art describes a reading apparatus capable of executing a pull scan in which a scanner reads a document in response to an execution instruction from an external device. In the reading apparatus, a list of users permitted to execute the pull scan is registered in advance, and when an execution instruction of the pull scan is received, it is authenticated whether a user who has issued the execution instruction of the pull scan matches a registered user. When the authentication is successful, the reading apparatus starts a pull scan.

In the reading apparatus described in the related art, a registered user is permitted to execute the pull scan, but an unregistered user is uniformly prohibited to execute the pull scan. Thus, convenience for a user may be poor, and there is room for improvement.

An object of the present disclosure is to provide a reading apparatus capable of balancing security and convenience for a user.

SUMMARY

A reading apparatus including a user interface. a scanner. and a controller. The controller is configured to perform a push scan that causes the scanner to read a document according to an execution instruction corresponding to an operation on the user interface. The controller is configured to perform a pull scan that causes the scanner to read the document according to an execution instruction from an external device. The controller is configured to set a restriction setting value relating to a restriction on the push scan. The controller is configured to restrict the push scan according to the restriction setting value. The controller is configured to specify whether authentication is necessary with respect to the execution instruction of the push scan, based on the restriction setting value. In a case where the controller receives the execution instruction of the pull scan and it is specified that the authentication is necessary, in a logged-in state where a user logs into the reading apparatus. The controller is configured to perform the pull scan, in a case where a condition for successful authentication with respect to the execution instruction of the pull scan is satisfied and a user indicated by user information included in the execution instruction of the pull scan matches the user who logs into the reading apparatus. The controller is configured to restrict the pull scan, in a case where the condition for successful authentication with respect to the execution instruction of the pull scan is satisfied and the user indicated by the user information included in the execution instruction of the pull scan does not match the user who logs into the reading apparatus.

A reading apparatus including a user interface, a scanner, and a controller. The controller is configured to perform a push scan that causes the scanner to read a document according to an execution instruction corresponding to an operation on the user interface. The controller is configured to perform a pull scan that causes the scanner to read the document according to an execution instruction from an external device. The controller is configured to set a restriction setting value relating to a restriction on the push scan. The controller is configured to restrict the push scan according to the restriction setting value. The controller is configured to specify whether authentication is necessary, based on the restriction setting value. In a case where it is specified that the authentication is unnecessary, the controller is configured to perform the pull scan without the authentication. In a case where it is specified that the authentication is necessary, the controller is configured to perform the pull scan, in a case where the authentication is successful, and not perform the pull scan, in a case where the authentication is failed.

A reading apparatus including a user interface, a scanner, and a controller. The controller is configured to perform a scan that causes the scanner to read a document according to an execution instruction. In which in a case where the controller receives an execution instruction of the scan, the controller is configured to restrict the scan according to a restriction setting value. In a case where a restriction setting value corresponding to restricting the scan is set and the controller receives an execution instruction of a pull scan from an external device, the controller is configured to perform authentication and, in a case where the authentication is successful, perform the pull scan; and perform authentication and, in a case where the authentication is failed, restrict the pull scan. In a case where the restriction setting value corresponding to restricting the scan is set and the controller receives an execution instruction of a push scan, the controller is configured to restrict the push scan without performing the authentication.

BRIEF DESCRIPTION OF DRAWINGS

FIG. 5 shows an SFL database.

FIG. 6 is a flowchart showing processing executed by a controller of the MFP.

FIG. 7 is a flowchart showing processing executed in step S11 of FIG. 6.

DESCRIPTION

First Embodiment

Figure 1:
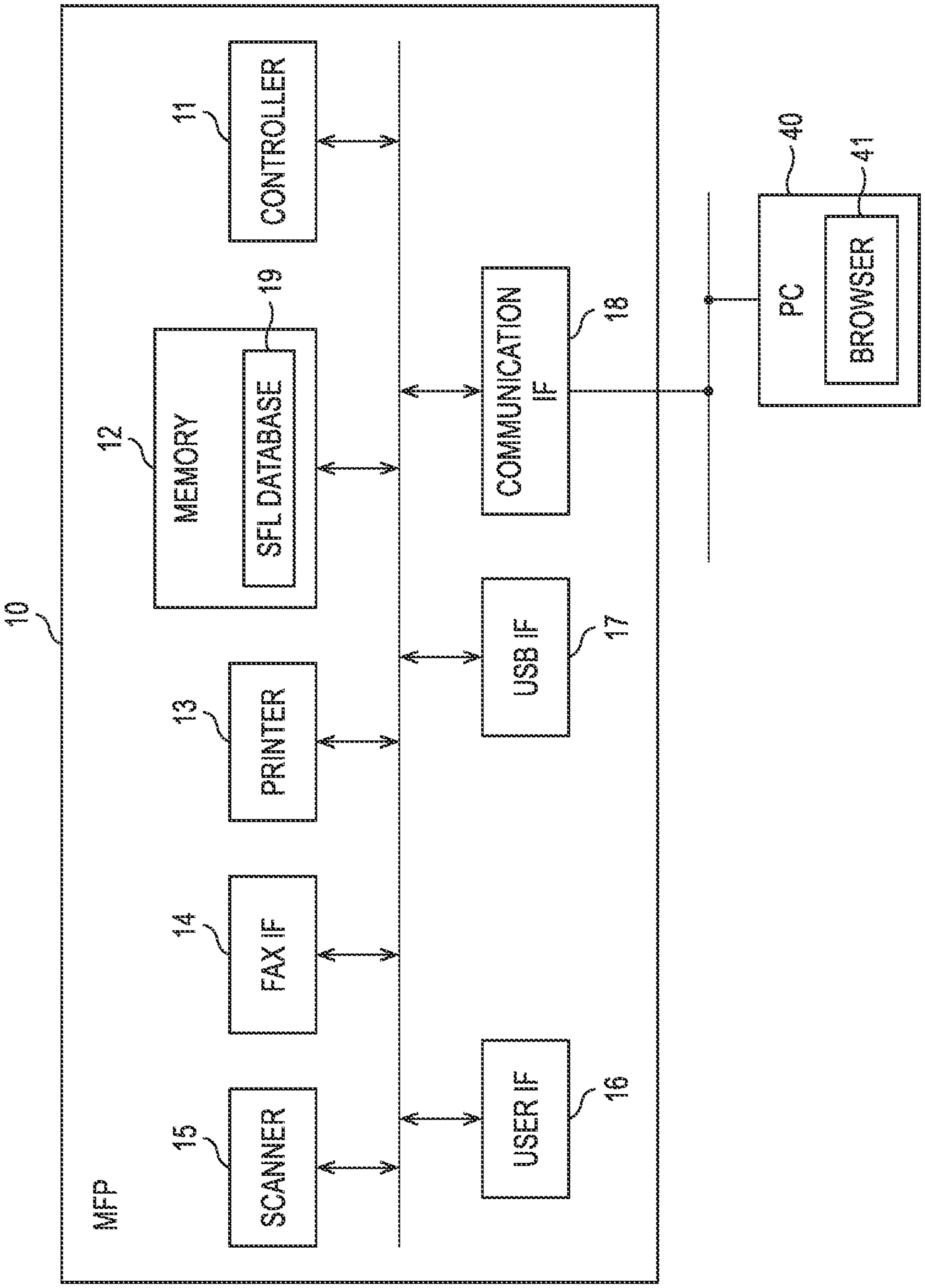
FIG. 1 is a configuration diagram of an MFP.

An embodiment of a reading apparatus will be described using a multi function peripheral (MFP). As shown in FIG. 1, an MFP 10 includes a controller 11, a memory 12, a printer 13, a FAX IF 14, a scanner 15, a user IF 16, a USB IF 17, and a communication IF 18. These components are communicably connected to each other via a bus.

The communication IF 18 is configured to the MFP 10 to a network. Accordingly, the MFP 10 is configured to communicate with a PC 40 connected to the network, via the network, according to a predetermined protocol. The scanner 15 includes, for example, a reading sensor such as a CCD or a CIS, and is configured to generate image data according to the reading of a document. The printer 13 is configured to print an image on a recording medium such as a sheet or a disk. The sheet is also referred to as paper. As a recording method of the printer 13, an ink jet method, an electrophotographic method, or the like can be adopted.

The user IF 16 is an interface configured to receive various operations on the MFP 10 performed by a user. The user IF 16 includes a touch panel including a liquid crystal display, various switches, and the like. The USB IF 17 is configured to read and write data conforming to the USB standard from and to a USB-compatible storage medium detachably connected. The USB-compatible storage medium is, for example, a USB memory. The communication IF 18 is an interface for connecting the MFP 10 to the network. The communication IF 18 enables the MFP 10 to perform wired LAN or wireless LAN communication with the PC 40.

The memory 12 is configured by combining a volatile memory such as a RAM, a nonvolatile memory such as an NVRAM, a ROM, and the like. An SSD, an HDD, or the like may be used as the nonvolatile memory. A buffer provided in the controller 11 and used when various programs are executed may also be regarded as a part of the memory 12. The memory 12 may be a storage medium readable by the controller 11. The storage medium readable by the controller 11 is a non-transitory medium. The non-transitory medium also includes a recording medium such as a CD-ROM or a DVD-ROM, in addition to the above-described examples. The non-transitory medium is also a tangible medium. On the other hand, an electric signal conveying a program downloaded from a server or the like on the internet is a computer-readable signal medium, which is a kind of computer-readable medium, but is not included in the non-transitory computer-readable storage medium.

The memory 12 is configured to store firmware (not shown) as a program executable by the controller 11. The present embodiment mainly shows processing of the controller 11 according to a command written in the program. That is, processing such as "determination", "calculation", "specification", "acquisition", "reception", and "control" to be described below represents the processing of the controller 11. The term "acquisition" is used as a concept indicating that a request is not essential. That is, processing of receiving data without a request from the controller 11 is also included in a concept indicating that "the controller 11 acquires data". Further, the term "data" in the present specification is represented by a controller-readable bit string. Data having substantially the same meaning and different formats are treated as the same data. The same applies to "information" in the present specification.

The controller 11 is also configured to function as a Web server for displaying a predetermined Web page on the PC 40. The controller 11 is configured to cause a browser 41 to be described later of the PC 40 to display the Web page by transmitting, to the PC 40, Web page data for displaying the Web page. The controller 11 is also configured to function as a Web server by executing the firmware (not shown).

Next, a configuration of the PC 40 will be described. The PC 40 includes a communication IF, a memory, a controller, a display, and a user IF, which are not shown. The memory of the PC 40 is configured to store an OS and the browser 41. The browser 41 is configured to cause the display to display the Web page corresponding to the Web page data transmitted from the MFP 10. An external device is not limited to the PC 40 and may be a portable terminal such as a smart phone as long as the external device can transmit an execution instruction of a pull scan to be described later to the MFP 10.

Figure 2:
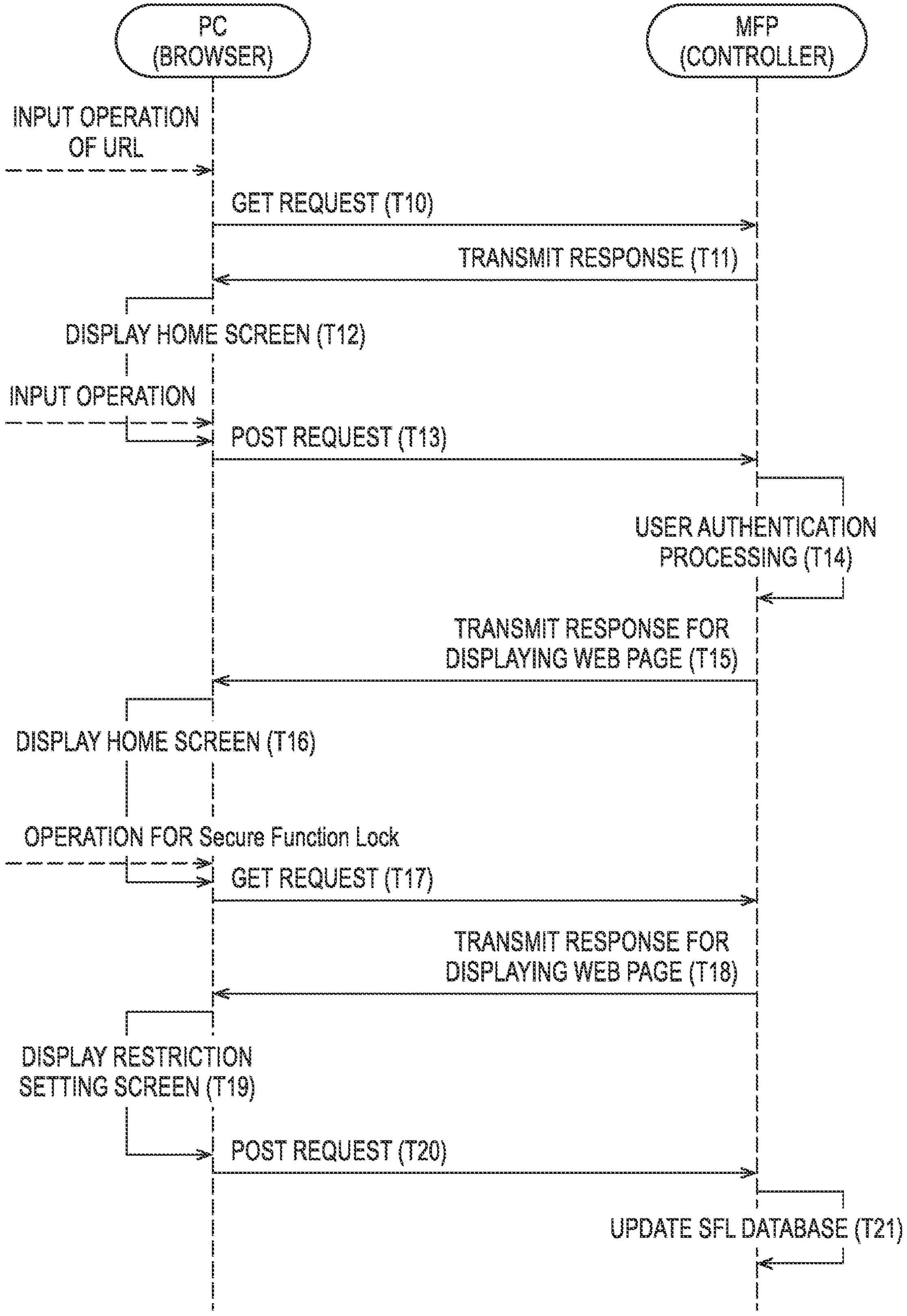
FIG. 2 is a timing chart showing processing performed between a PC and an MFP.

Next, a procedure of processing of setting restriction setting values relating to restrictions on respective functions of the MFP 10 using the function as a Web server of the controller 11 will be described with reference to FIG. 2. The user operates the PC 40 to input, to the browser 41, a URL for specifying the Web server of the MFP 10. The browser 41 is configured to transmit a GET request for HTTPS communication including the input URL at a timing 10 (hereinafter, the timing is also referred to as "T"). Upon receiving the GET request from the browser 41, the controller 11 transmits an HTTPS response corresponding to the GET request.

A response returned at T11 includes the Web page data for displaying a home screen before login. Upon receiving the Web page data, the browser 41 displays the home screen before the login on the display using the Web page data at T12. Details of the home screen will be described later.

In a case where the user inputs a login password in a password input field of the home screen, the browser 41 transmits a POST request including the login password to the controller 11, at T13. Upon receiving the POST request including the login password, the controller 11 performs user authentication processing using the login password included in the POST request at T14.

In the user authentication processing executed at T14, the controller 11 determines whether an input password included in the POST request matches a registered login password. The controller 11 is configured to compare the input password included in the POST request with a registered password. In a case where both passwords completely match, the controller 11 permits user authentication to the MFP 10. Alternatively, in a case where the input password and the registered password partially match, the controller 11 may permit the user authentication to the MFP 10.

In a case where the input password matches the registered password in the user authentication processing at T14, the controller 11 generates a response when the user authentication processing is established. The response includes Web page data for displaying a home screen after login, which is a Web page.

At T15, the controller 11 transmits the response to the browser 41, in order to display the home screen after the login. Upon receiving the response, the browser 41 displays a home screen 20 after the login, which is a Web page, on the user IF 16 at T16. The home screen 20 after the login shown in FIG. 3 includes a page display field 21 including an item section 22 and a content display section 23. In the item section 22, icons for receiving selection operations of various functions of the MFP 10 are displayed. In addition, the home screen 20 may include a URL display field for displaying a URL of a registration site above the page display field 21.

In a case where a selection operation is performed on any of the icons in the item section 22, the browser 41 transmits, to the controller 11, a GET request for requesting Web page data corresponding to the selected icon. The controller 11 is configured to transmit, to the PC 40, a response including the Web page data, in accordance with the requested request. Accordingly, the browser 41 can display a Web page corresponding to a selected item on the content display section 23. Instead of transmitting the Web page data as a response to the browser 41, the controller 11 may transmit only data indicating a screen to be displayed on the content display section 23 to the browser 41, and the browser 41 may change a display on the content display section 23 using the data.

In this example, the home screen 20 after the login shows a state where the user has selected "User Restriction Function" from an icon 22A "Administrator" of the item section 22. The "User Restriction Function" is a function of setting a setting value relating to a restriction for a user who uses the MFP 10. The setting value relating to the restriction can also be said to be a setting value relating to the permission. The content display section 23 includes check boxes 24A, 24B, 24C, and 24D corresponding to items "Off", "Secure Function Lock", "Active Direction Authentication", and "LDAP Authentication", respectively, for receiving detailed setting instructions relating to the function "User Restriction Function".

In a case where the user checks the check box 24A of the item "Off" displayed on the content display section 23, an invalid setting of the function "User Restriction Function" is designated, and when the check box 24A is not checked and another check box is checked, a valid setting of the "User Retraction Function" is designated. An item "Secure Function Lock" is an item for receiving restriction settings of respective functions of the MFP 10 for each user. Hereinafter, the "Secure Function Lock" is also referred to as "SFL". In a case where the user checks the check box 24B of "SFL", it is possible to set restriction setting values indicating restrictions on respective functions using a restriction setting screen 30 shown in FIG. 4 to be described later.

Figure 4:
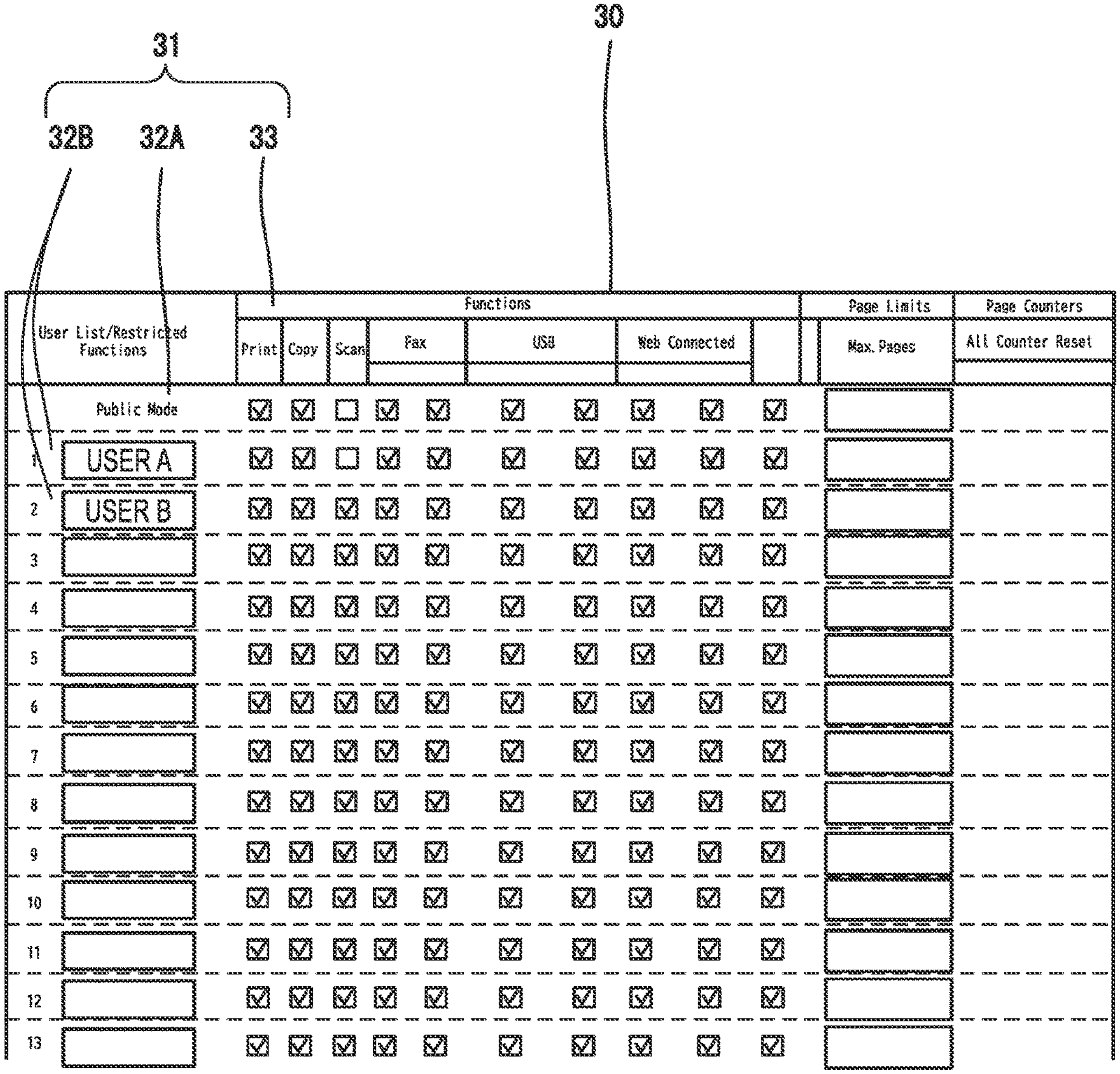
FIG. 4 shows a restriction setting screen.

In a case where the user checks the check box 24B of "SFL" included in the content display section 23 of the home screen 20 and operates a submit button 26, the browser 41 transmits a GET request for requesting the MFP 10 for Web page data for displaying the restriction setting screen 30 shown in FIG. 4 on the content display section 23 at T17. Upon receiving the GET request from the PC 40, the MFP 10 transmits, to the PC 40 at T18, response data including the Web page data for allowing the browser 41 to display the restriction setting screen 30. In a case where the user operates a cancel button 25 of the home screen 20 by operating the PC 40, an input made to the content display section 23 of the home screen 20 is canceled.

Upon receiving the response data from the MFP 10, the browser 41 displays the restriction setting screen 30 shown in FIG. 4, at T19. The restriction setting screen 30 includes a restriction designation field 31 for receiving a designation of a user and a function to be restricted in the function "SFL". The restriction designation field 31 includes a user designation item 32 (32A, 32B) for designating a user to be restricted and a function designation item 33 for designating a function to be restricted. Respective values in the restriction setting screen 30 correspond to registered contents in an SFL database 19 stored in the memory 12 of the MFP 10.

In the user designation item 32, a "Public Mode" 32A is an item for designating a logged-out state as a target of the function "SFL". It can also be said that the "Public Mode" 32A is an item for setting a restriction without specifying a user. In the user designation item 32, an individual user item 32B is an item for designating an input user, that is, a specific user as a target of the function "SFL".

The function designation item 33 is an item for receiving a designation of a function to be restricted by the function "SFL". In the restriction setting screen 30 shown in FIG. 4, a check box indicating whether a restriction is set for each of functions "print", "copy", "scan", "FAX", "USB", and "Web connected" of the MFP 10 is displayed in the function designation item 33. The function "scan" corresponds to a push scan to be described later. In the function designation item 33, a checked function is a function designated not to set a restriction, and an unchecked function is a function designated to set a restriction. Although not shown, the function "FAX" includes individual functions of "FAX transmission" and "FAX reception", and there is a check box for each individual function. The function "USB" includes individual functions of "USB direct print" and "Scan to USB", and there is a check box for each individual function. The "Web connected" includes individual functions of "upload" and "download", and there is a check box for each individual function.

The function designation item 33 includes "Page Limits" for designating an upper limit of the number of printable pages and "Page Counters" indicating the cumulative number of printed pages in a logged-out state or the cumulative number of printed pages for each user, in addition to the restrictions on the respective functions.

For example, in the function designation item 33 related to the "Public Mode" 32A in the user designation item 32, only the function "scan" is not checked, and other functions are checked. This indicates that in a state where no one logs into the MFP 10, execution of the function "scan" is restricted, and execution of other functions is not restricted. Similarly, in the function designation item 33 related to a "user A" in the individual user item 32B, only the function "scan" is not checked, and other functions are checked. This indicates that in a case where the "user A" logs in, execution of the function "scan" is restricted, and other functions are not restricted. In the function designation item 33 related to a "user B" in the individual user item 32B, all functions are checked. This indicates that in a case where the "user B" logs in, execution of all functions including the function "scan" is not restricted.

In a case where the user operates a confirm button (not shown) in a state where the restriction setting screen 30 is displayed on the home screen 20, at T20, the browser 41 transmits, to the MFP 10, a POST request including information "ON" indicating that the function "SFL" is valid and a content of each restriction setting value designated on the restriction setting screen 30. Upon receiving the POST request including the information indicating that the function "SFL" is valid and a designated content of each restriction setting value, the controller 11 updates the content of the SFL database 19 stored in the memory 12, at T21.

FIG. 5 shows a part of the SFL database 19 updated using the designated content of the restriction setting value designated on the restriction setting screen 30 shown in FIG. 4. In FIG. 5, a restriction setting value "ON" indicating that the function "SFL" is valid is registered in a head field 19A. In a field 19B, restriction setting values for respective functions are registered for the "Public Mode", that is, the logged-out state. Specifically, in the field 19B, a restriction setting value "restricted" indicating that the function "scan" is restricted, that is, the execution of the "scan" is not enabled, is registered. Similarly, in a field 19C, restriction setting values for respective functions for the "user A" are registered, and a restriction setting value "restricted" indicating that the function "scan" is restricted is registered. In a field 19D, restriction setting values for respective functions for the "user B" are registered, and a restriction setting value "permitted" indicating that the function "scan" is not restricted, that is, the execution of the "scan" is enabled is registered. In a case where the execution is enabled, it can be said that the execution is permitted.

Next, a procedure of processing executed by the controller 11 in a case where the user uses the function "scan" of the MFP 10 will be described. The MFP 10 can execute a "push scan" function and a "pull scan", as the function "scan". The "push scan" is a scan that causes the scanner 15 to read a document according to an execution instruction corresponding to an operation on the user IF 16. The "pull scan" is a scan that causes the scanner 15 to read a document according to an execution instruction transmitted from an external device in response to an operation on the external device. In the present embodiment, the external device is the PC 40.

First, in step S10, the controller 11 determines whether an execution instruction of a push scan is received. Hereinafter, the step is also referred to as "S". Specifically, in a case where an execution instruction of the function "scan" is received by an operation on the user IF 16 of the MFP 10, the controller 11 determines that an execution instruction of the push scan is received (step S10: YES), and proceeds to step S11. In response to reception of the operation on the user IF 16, the controller 11 transmits a push scan request to an external device (in this example, PC 40). The external device that has received the request returns an execution instruction of "scan" to the MFP 10. In a case where the reply is received, the controller 11 determines that the execution instruction of the push scan is received. In a case where the execution instruction transmitted from the external device is received according to the operation on the external device, the controller 11 determines that an execution instruction of a pull scan is received (step S10: NO), and proceeds to step S12.

The execution instruction of "scan" may include information indicating whether the execution instruction is an execution instruction according to reception of the operation on the user IF 16 or an execution instruction according to the operation on the external device. Based on the information, the controller may determine whether the execution instruction is an execution instruction of a push scan or an execution instruction of a pull scan. In response to the reception of the operation on the user IF 16, the controller 11 may determine that the execution instruction of the push scan is received without transmitting the request to the external device, and the processing may proceed to step S11.

In a case where the controller 11 receives the execution instruction of the push scan via the user IF 16 (step S10: YES), a procedure of restricting the push scan according to the restriction setting values registered in the SFL database 19 in step S11 will be described. FIG. 7 is a flowchart showing a procedure of request processing of the push scan executed by the controller 11 in step S11.

First, processing in a state where a user does not log in the MFP 10 will be described. The state where a user does not log in the MFP 10 is also referred to as the "Public Mode" for convenience. In step S20, the controller 11 refers to whether the function "SFL" is valid "ON" or invalid "OFF" registered in the field 19A of the SFL database 19 stored in the memory 12.

In a case where the controller 11 determines that the function "SFL" is invalid (step S21: NO), the controller 11 proceeds to step S29, and executes scan processing of allowing the scanner 15 to read a document set on a document table. That is, the controller 11 executes the processing without imposing a restriction on the push scan, and ends the processing of FIGS. 6 and 7.

In this example, in the SFL database 19 shown in FIG. 5, since the restriction setting value indicating whether the function "SFL" is valid is "ON", the controller 11 determines that the function "SFL" is valid (step S21: YES). Then, the controller 11 proceeds to step S22 and confirms whether there is a login user who has logged in by an operation on the user IF 16. In this example, since the user does not log in the MFP 10 (step S23: YES), the controller 11 proceeds to step S24 and refers to a restriction setting value corresponding to the function "scan" in the "Public Mode" in the SFL database 19.

Since the restriction setting value corresponding to the function "scan" in the "Public Mode" is "restricted" in the SFL database 19 (step S25: YES), the controller 11 proceeds to step S28 and notifies an error indicating that the function "scan" is not executable. In the present embodiment, the controller 11 is configured to perform notification by displaying on the user IF 16 an error screen indicating that the function "scan" is not executable. That is, the controller 11 imposes a restriction on the push scan in the logged-out state. In the present embodiment, the restriction on the function "scan" is that the scan processing is not executed. The controller 11 ends the processing of FIGS. 6 and 7.

Next, processing in a case where the "user A" logs into the MFP 10 will be described. Since the "user A" logs into the MFP 10 (step S23: NO), the controller 11 refers to the restriction setting value corresponding to the function "scan" of the user A in the SFL database 19, in step S26. As shown in FIG. 5, in the field 19C, the restriction setting value corresponding to the function "scan" of the "user A" is set to "restricted". Since the restriction setting value corresponding to the function "scan" of the user A who is the login user indicates "restricted" (step S27: YES), the controller 11 proceeds to step S28. In step S28, the controller 11 notifies an error indicating that the scan described above is not executable, and ends the processing of FIGS. 6 and 7.

Next, processing in a case where the "user B" logs into the MFP 10 will be described. Since a restriction setting value "ON" that does not restrict the function "scan" is registered for the "user B" in the SFL database 19 (step S27: NO), the controller 11 proceeds to step S29 and executes the scan processing (push scan). That is, the controller 11 executes the push scan without any restriction.

Here, the login will be described. User information on the "user A" and the "user B" is registered in the SFL database 19. The user information includes a user ID and a password corresponding to the user ID. In a case where the user ID registered in the SFL database 19 and the password corresponding to the user ID are input via the user IF 16 in the login processing, the controller 11 performs various pieces of processing assuming that the MFP 10 is in a login state corresponding to the input user information. For example, in a case where the user ID "user A" and the corresponding password are input, the controller 11 performs various pieces of processing assuming that the MFP 10 is in the login state corresponding to the input "user A". The user information registered in the SFL database 19 can also be said to be user information on a user who is permitted to log into the MFP 10. The login state corresponding to the user information is also referred to as a state where the user indicated by the user information logs into the MFP 10. The login state corresponding to the "user A" is also referred to as a state where the "user A" logs into the MFP 10. The user indicated by the user information in a case where the user indicated by the user information is in a logged-in state is also referred to as a "login user". The user ID and the password may be input in the login processing by bringing an ID card corresponding to the user ID registered in the SFL database 19 close to or into contact with the MFP 10. Information used for the login processing may be stored in an area other than the SFL database 19 in the memory 12. In this case, the controller 11 may refer to the area in the memory 12 in the login processing and the processing of FIG. 10.

Next, processing executed by the controller 11 in a case where an execution instruction of a pull scan is received from the PC 40 will be described. First, processing in a case where the "user A" operates the PC 40 to execute a pull scan in a state where the MFP 10 is not logged in, that is, in the "Public Mode", will be described.

Figure 8:
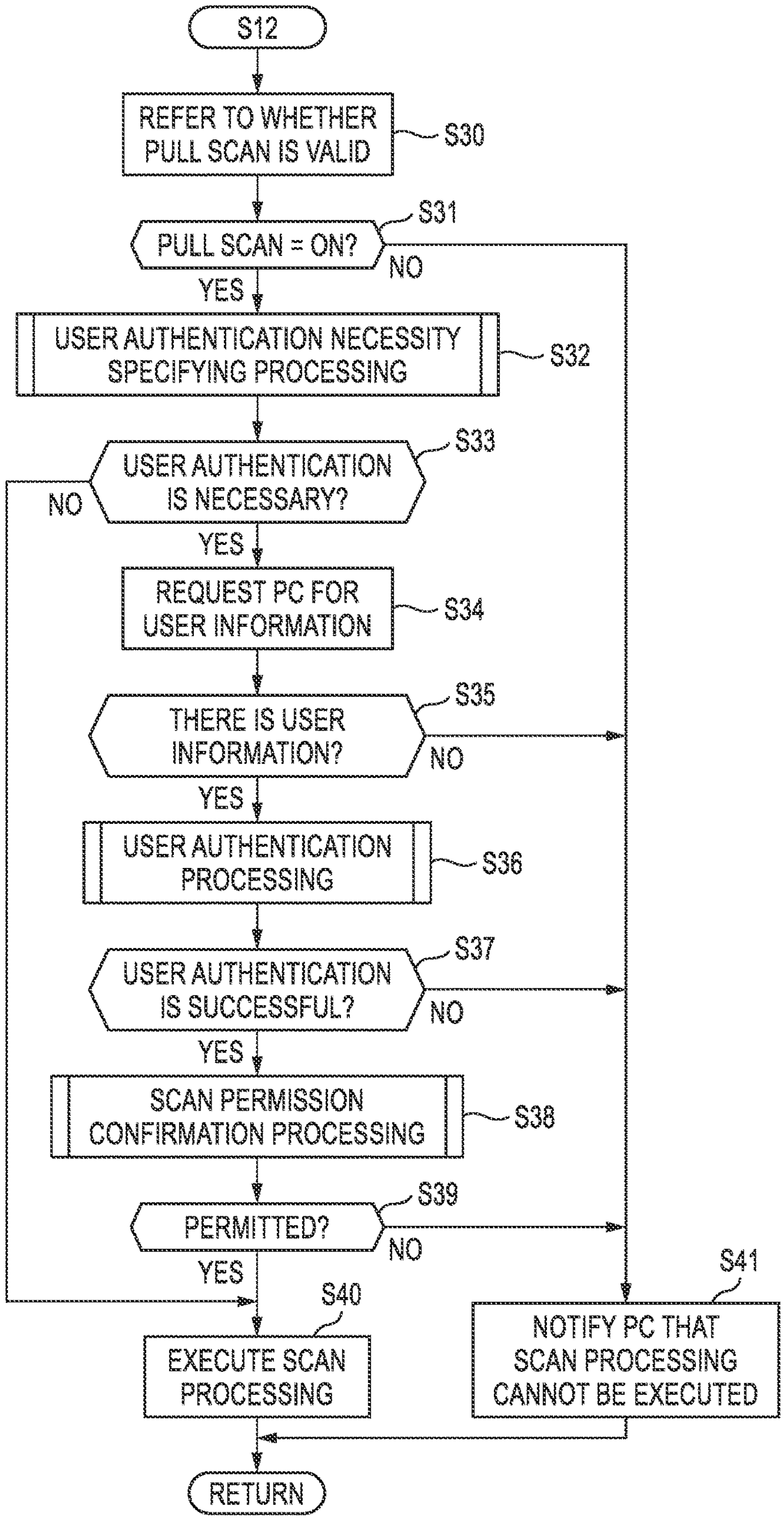
FIG. 8 is a flowchart showing processing executed in step S12 of FIG. 6.

FIG. 8 is a flowchart showing a procedure of the processing executed by the controller 11 in step S12. In step S30, the controller 11 determines whether execution of the pull scan is set to be enabled or disabled in the MFP 10. In this example, it is assumed that the pull scan is set to be enabled (step S31: YES), and the controller 11 proceeds to step S32 and executes user authentication necessity specifying processing. The controller 11 uses a restriction setting value corresponding to the push scan in the "Public Mode" to specify whether the user authentication is necessary for the execution instruction of the pull scan in the user authentication necessity specifying processing. In a case where the pull scan is set to be invalid in the MFP 10 (step S31: NO), the controller 11 proceeds to step S41 and notifies the PC 40 that the pull scan cannot be executed. That is, in a case where the pull scan is set to be invalid in the MFP 10, the pull scan is not executed regardless of who logs into the MFP 10. Information indicating whether the pull scan is set to be valid or invalid is stored in the memory 12 separately from the SFL database 19.

Figure 9:
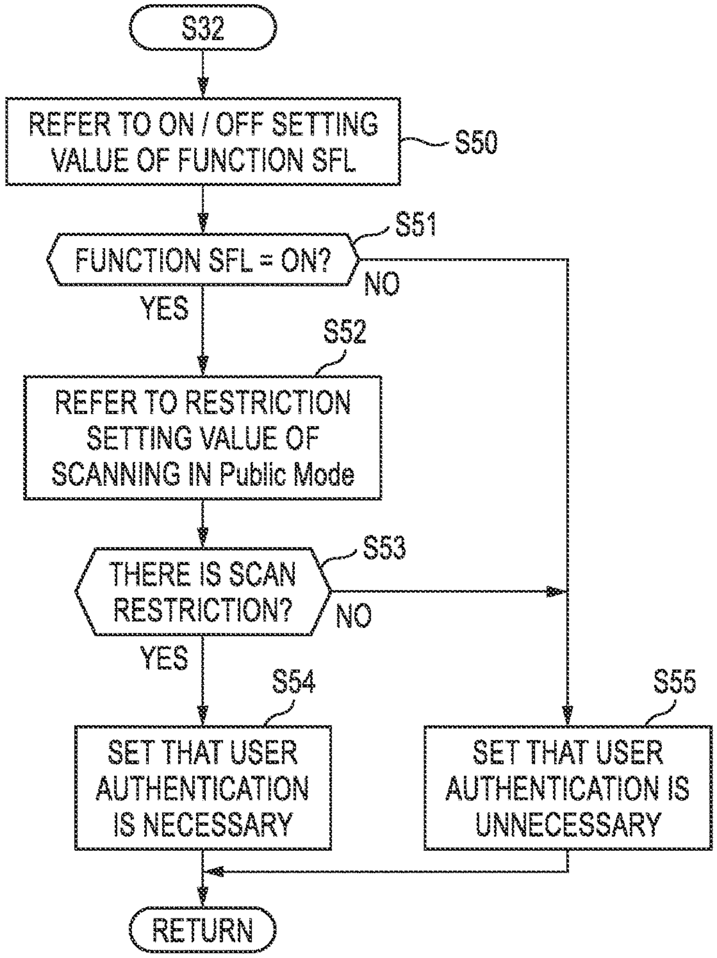
FIG. 9 is a flowchart showing processing executed in step S32 of FIG. 8.

FIG. 9 is a flowchart showing a procedure of the processing executed by the controller 11 in step S32 of FIG. 8. First, the controller 11 refers to the field 19A of the SFL database 19 in step S50. In the SFL database 19 shown in FIG. 5, since the function "SFL" is set to be valid (step S51: YES), the controller 11 proceeds to step S52, and refers to a restriction setting value corresponding to the function "scan" in the "Public Mode" in the SFL database 19. That is, with reference to the field 19B of the SFL database 19, it is determined whether the restriction setting value indicates that the push scan in the logged-out state is restricted.

In this example, in the SFL database 19 shown in FIG. 5, since the restriction setting value "restricted" indicating the restriction on the function "scan" in the "Public Mode" (step S53: YES) is registered, and the processing proceeds to step S54. In step S54, the controller 11 sets that the user authentication is necessary for the execution instruction of the pull scan. For example, the controller 11 sets a necessity determination flag to a value indicating that the user authentication is necessary.

The controller 11 proceeds to step S33 of FIG. 8. Since the necessity determination flag is set to a value indicating that the user authentication is necessary, that is, the user authentication is necessary (step S33: YES), the controller 11 proceeds to step S34, and makes a GET request to the PC 40 for requesting user information necessary for the user authentication. Upon receiving the request for the user information from the MFP 10, the PC 40 transmits response data including the user information on the user operating the PC 40 to the MFP 10. Specifically, the user information includes a user ID and a password. In this case, the PC 40 is configured to transmit response data including the user information on the "user A". The PC 40 may be configured to transmit response data including user information on a user who logs into the PC 40. The PC 40 may be configured to transmit response data including user information input in a case where the user logs into the PC 40.

In a case where the PC 40 does not transmit the user information in response to the GET request from the MFP 10, the user authentication processing in step S36 to be described later cannot be executed. Therefore, in a case where the user information is not received from the PC 40 (step S35: NO), the controller 11 proceeds to step S41 and notifies the PC 40 that the scan processing (pull scan) cannot be executed.

Figure 10:
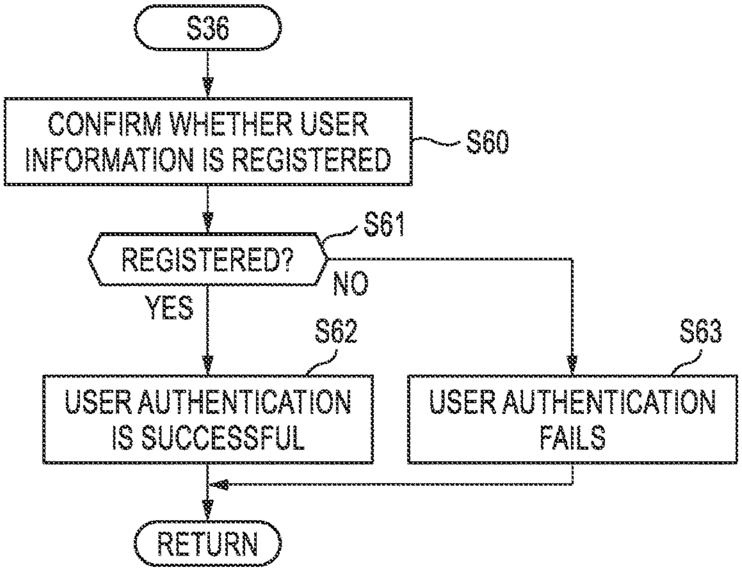
FIG. 10 is a flowchart showing processing executed in step S36 of FIG. 8.

Here, assuming that the user information is received from the PC 40 (step S35: YES), the controller 11 proceeds to step S36 and executes the user authentication processing. FIG. 10 is a flowchart showing a procedure of the processing executed by the controller 11 in step S36. First, in step S60, the controller 11 confirms whether the user information (in this example, the information indicating the user A) received from the PC 40 is registered in the SFL database 19 as information used for the login processing. As shown in FIG. 5, in the SFL database 19, user information related to at least the "user A" and the "user B" is registered.

Since the user information received from the PC 40, that is, the user ID and the password is registered in the SFL database 19 (step S61: YES), the controller 11 proceeds to step S62 and sets that the user authentication is successful. For example, the controller 11 sets an authentication flag indicating whether the user authentication is successful to a value indicating success.

In a case where the user information received from the PC 40 is not registered in the SFL database 19 in step S61 (step S61: NO), the controller 11 proceeds to step S63 and sets that the user authentication fails. The controller 11 sets the authentication flag to a value indicating failure. Since the user authentication fails in step S37 of FIG. 8 (step S37: NO), the controller 11 proceeds to step S41 and notifies the PC 40 that the scan processing cannot be executed.

Figure 11:
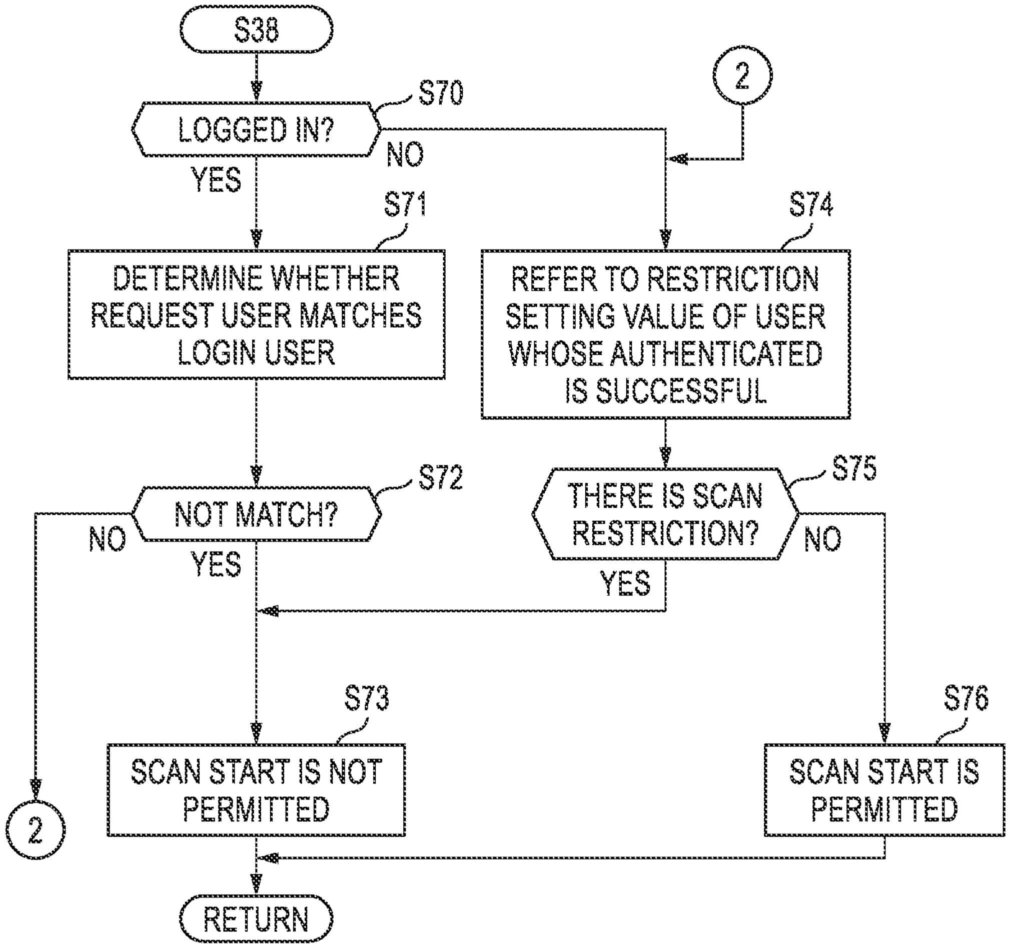
FIG. 11 is a flowchart showing processing executed in step S38 of FIG. 8.

In this example, since the user authentication is successful in step S37 of FIG. 8 (step S37: YES), the controller 11 proceeds to step S38 and executes scan permission confirmation processing. FIG. 11 is a flowchart showing a procedure of the processing executed by the controller 11 in step S38.

In step S70, the controller 11 determines whether the MFP 10 is logged in, that is, in the "Public Mode." In this example, since the MFP 10 is in the "Public Mode" (step S70: NO), the processing proceeds to step S74.

In step S74, the controller 11 refers to a restriction setting value of the function "scan" for a user with successful user authentication in step S36 described above. In this example, in the field 19C of the SFL database 19, a restriction setting value "restricted" indicating a restriction is registered on the function "scan" corresponding to the "user A". Therefore, the function "scan" is restricted for the "user A" in step S75 (step S75: YES), and thus the controller 11 proceeds to step S73 and sets a flag indicating that the scan start is not permitted.

In step S39 of FIG. 8, since the flag indicating that the scan start is not permitted is set, that is, the scan processing is not permitted (step S39: NO), the controller 11 proceeds to step S41 and notifies the PC 40 that the pull scan cannot be executed. Since the restriction of the push scan is set for the "user A", the pull scan is restricted even in a case where the authentication in the user authentication processing of step S36 is successful. Then, the controller 11 ends the processing of FIG. 8.

Next, processing in a case where the "user A" operates the PC 40 to execute the pull scan in a state where the "user A" logs into the MFP 10 will be described. Also in this example, the controller 11 executes the processing of step S30 to step S37 of FIG. 8 described above. The controller 11 specifies that the push scan in the "Public Mode" is restricted in the user authentication necessity specifying processing of step S32, and determines that the user authentication is necessary in step S33 (step S33: YES). On the condition that the user authentication is successful (step S37: YES), the controller 11 executes the scan permission confirmation processing in step S38.

Since the "user A" is in the logged-in state in step S70 of FIG. 11 (S70: YES), the controller 11 proceeds to step S71 and determines whether the user who has requested the pull scan matches the login user. Specifically, the controller 11 compares the user information used in the user authentication processing of S36 described above with user information on the login user to determine whether the users match. That is, the controller 11 determines whether the user who has requested to start a pull scan by operating the PC 40 matches a user who logs into the MFP 10.

In a case where it is determined that the users match (step S72: NO), the controller 11 proceeds to step S74. In step S74, the controller 11 determines whether the restriction on the function "scan" is set for the user whose user authentication is successful in step S36. Since the function "scan" of the user A whose user authentication is successful is restricted in the SFL database 19 (step S75: YES), the controller 11 proceeds to step S73 and does not permit the start of the scan processing (pull scan). The controller 11 proceeds to step S39 of FIG. 8. As described above, since the scan processing is not permitted (step S39: NO), the controller 11 proceeds to step S41 and notifies the PC 40 that the pull scan cannot be executed.

In a case where it is determined in step S72 of FIG. 11 that the users do not match (step S72: NO), the controller 11 proceeds to step S73 and does not permit the start of the scan processing (pull scan). Therefore, the scan processing is not permitted in FIG. 8 (step S39: NO), and thus the controller 11 proceeds to step S41 and notifies the PC 40 that the pull scan cannot be executed.

Next, processing in a case where the "user B" operates the PC 40 to execute the pull scan in the state "Public Mode" in which the "user B" does not log into the MFP 10 will be described. The controller 11 specifies that the push scan in the "Public Mode" is restricted in the user authentication necessity specifying processing of step S32, and determines that the user authentication is necessary in step S33 (step S33: YES). On the condition that the user authentication is successful (step S37: YES), the controller 11 executes the scan permission confirmation processing in step S38.

Since the MFP 10 is in the "Public Mode" in step S70 of FIG. 11 (step S70: NO), the controller 11 proceeds to step S74. In step S74, the controller 11 refers to a restriction setting value corresponding to the function "scan processing" in the SFL database 19 for the user B whose user authentication is successful. In this example, in the field 19D of the SFL database 19, a restriction setting value "permitted" corresponding to the function "scan" in the "user B" is registered. Therefore, the function "scan" is not restricted (step S75: NO), and thus the controller 11 proceeds to step S76 and sets a flag indicating that the scan start is permitted.

In step S39 of FIG. 8, since the flag indicating that the scan start is permitted is set, that is, the scan processing is permitted (step S39: YES), the controller 11 proceeds to step S40 and executes the scan processing (pull scan). That is, since no restriction is set for the push scan for the "user B", the controller 11 executes the pull scan on condition that the authentication is successful. Then, the controller 11 ends the processing of FIG. 8.

Next, processing in a case where the "user B" operates the PC 40 to execute the pull scan in a state where the "user B" logs into the MFP 10 will be described. The controller 11 specifies that the push scan in the "Public Mode" is restricted in the user authentication necessity specifying processing of step S32, and determines that the user authentication is necessary in step S33 (step S33: YES). On the condition that the user authentication is successful (step S37: YES), the controller 11 executes the scan permission confirmation processing in step S38. Since the "user B" is in the logged-in state in step S70 of FIG. 11 (step S70: YES), the controller 11 proceeds to step S71 and determines whether the user who has requested the pull scan by operating the PC 40 matches the login user of the MFP 10.

In a case where it is determined that the users match (step S72: NO), the controller 11 proceeds to step S74, and determines whether a restriction on the function "scan processing" is set for the user whose user authentication is successful. As described above, in the SFL database 19, since the restriction setting value corresponding to the function "scan" in the "user B" is "permitted" (step S75: NO), the controller 11 proceeds to step S76 and permits the start of the scan processing (pull scan). The controller 11 proceeds to step S39 of FIG. 8. As described above, since the scan processing is permitted (step S39: YES), the controller 11 proceeds to step S40, executes the pull scan, and ends the processing of FIG. 8.

In a case where it is determined in step S72 of FIG. 11 that the users do not match (step S72: NO), the controller 11 proceeds to step S73 and does not permit the start of the scan processing (pull scan). That is, even in a case where the user authentication is successful for the "user B" and the restriction setting value corresponding to the function "scan" in the "user B" is "permitted" in the SFL database 19, the pull scan is not permitted when the users do not match. Therefore, the scan processing is not permitted in FIG. 8 (step S39: NO), and thus the controller 11 proceeds to step S41 and notifies the PC 40 that the pull scan cannot be executed.

Next, an example will be described in which the pull scan is executed in a case where the restriction setting value "permitted" indicating no restriction is registered for the function "scan" in the "Public Mode" of the field 19B, unlike the SFL database 19 shown in FIG. 5. Also in this example, the controller 11 executes the processing of step S30 and step S31 of FIG. 8 described above.

In step S32, the controller 11 executes the user authentication necessity specifying processing. In step S51 of FIG. 9, since the function "SFL" is valid "ON" in the SFL database 19 (step S51: YES), the controller 11 proceeds to step S52 and refers to the restriction setting value of the function "scan" in the "Public Mode". In this example, since the restriction setting value "permitted" is registered for the function "scan" in the "Public Mode" in the SFL database 19 (step S53: NO), the processing proceeds to step S55. In step S55, the controller 11 sets a flag indicating that the user authentication is unnecessary in response to the execution instruction of the push scan.

In step S33 of FIG. 8, since the user authentication is unnecessary (step S33: NO), the controller 11 proceeds to step S40 and executes the scan processing (push scan) as described above. That is, in this example, since the push scan in the "Public Mode" is not restricted, the pull scan is not restricted for anyone.

Next, an example in which the function "SFL" is set to be invalid "OFF" in the SFL database 19 will be described. In step S32, the controller 11 executes the user authentication necessity specifying processing. In step S50 of FIG. 9, the controller 11 refers to setting values for the valid "ON" and invalid "OFF" of the function "SFL" in the field 19A of the SFL database 19. In this example, since the function "SFL" is set to be invalid "OFF" in the SFL database 19 (step S51: NO), the controller 11 proceeds to step S55 and sets that the user authentication is unnecessary in response to the execution instruction of the push scan. The controller 11 sets the necessity determination flag to a value indicating that the user authentication is unnecessary.

In step S33 of FIG. 8, since the user authentication is unnecessary (step S33: NO), the controller 11 proceeds to step S40 and executes the scan processing. That is, in this example, since the function "SFL" is invalid, the pull scan is not restricted for anyone.

The present embodiment described above can achieve the following effects.

In a case where the controller 11 of the MFP 10 receives the execution instruction of the pull scan in a state where the user logs into the MFP 10 and specifies that the user authentication is necessary, the controller 11 executes the pull scan in a case where a condition for successful user authentication is satisfied and in a case where the user operating the PC 40 indicated by the user information matches the user that logs into the MFP 10. On the other hand, in a case where the user indicated by the user information does not match a logged-in user, the controller 11 restricts the pull scan even in a case where the condition for successful user authentication is satisfied. Accordingly, in a case where the execution instruction of the pull scan is received, security for the pull scan can be determined according to the restriction already set for the push scan. Further, in the logged-in state of the MFP 10, whether the user who operates the PC 40 matches the login user can be set as a condition for executing the pull scan. As a result, the security and the convenience for the user can be balanced.

In a case where the controller 11 receives the execution instruction of the pull scan from the PC 40, the controller 11 specifies that the user authentication is necessary in a case where the restriction setting value "restricted" is registered for the function "scan" in the "Public Mode" in the SFL database 19, and specifies that the user authentication is unnecessary in a case where the restriction setting value "restricted" is not registered for the function "scan" in the "Public Mode" in the SFL database 19. Accordingly, in a case where the restriction is set for the push scan in the logged-out state, it is possible to restrain a difference in level of security between the push scan and the pull scan by setting a restriction on the pull scan.

In a case where the controller 11 receives the execution instruction of the pull scan from the PC 40 in the "Public Mode" and specifies that the user authentication is necessary, the controller 11 executes the pull scan without requiring the user who operates the PC 40 indicated by the user information to match the user who logs into the MFP 10 in a case where the condition for successful user authentication is satisfied. Accordingly, in a situation where it is not necessary to determine whether the user requesting the pull scan matches the login user of the MFP 10, the controller 11 does not restrict the pull scan for any user as long as the condition for successful user authentication is satisfied.

In a case where the controller 11 receives the execution instruction of the pull scan in a state where the user logs into the MFP 10, and the restriction setting value "permitted" is registered for the push scan of the login user and the condition for successful user authentication is satisfied and in a case where the user indicated by the user information matches the logged-in user, the controller executes the pull scan. On the other hand, in a case where the restriction setting value "restricted" is registered for the push scan of the login user, the controller 11 restricts the pull scan even in a case where the condition for successful user authentication is satisfied. Accordingly, for a specific user for which the push scan is set to be restricted, even in a case where the user authentication is successful, it is possible to prevent a large difference in security level between the push scan and the pull scan by restricting the pull scan.

Modification of First Embodiment

In the above-described embodiment, in a case where the restriction setting value "restricted" is registered for the function "scan" in the "Public Mode", that is, the push scan in the logged-out state in the SFL database 19 (step S53: YES), the controller 11 requires the user authentication in the pull scan. Alternatively, in a case where the restriction setting value "restricted" is registered for the function "scan" corresponding to all the registered users in the SFL database 19 referred to in step S52 (step S53: YES), the controller 11 may require user authentication in the pull scan. Further, in a case where the restriction setting value "restricted" is registered for the function "scan" of a predetermined specific user in the SFL database 19 referred to in step S52 (step S53: YES), the controller 11 may require the user authentication in the pull scan.

The controller 11 may execute the user authentication processing in step S36 of FIG. 8 and the scan permission confirmation processing in step S38 as follows. In this example, in the user authentication processing executed in step S36, it is determined whether the user who operates the PC 40 matches the user who logs into the MFP 10 (processing of step S70 to step S72 of FIG. 11). First, in the user authentication processing executed in step S36, the controller 11 confirms whether the user information received from the PC 40 is registered in the memory 12 as an authentication target in step S60. In a case where the user information is registered as an authentication target (step S61: YES), the controller 11 determines whether the user has already logged into the MFP 10 in step S70 described in FIG. 11. In a case where the user has already logged in to the MFP 10 (step S70: YES), the controller 11 proceeds to step S71 and determines whether the user who has requested the pull scan matches the login user. In a case where it is determined that the users match (step S72: YES), the controller 11 proceeds to step S62 (FIG. 10), sets a flag indicating that the user authentication is successful, and proceeds to step S37. In a case where it is determined that the user has not logged into the MFP 10 (step S70: NO), the controller 11 proceeds to step S62, sets a flag indicating that the user authentication is successful, and proceeds to step S37. On the other hand, in a case where it is determined that the users do not match (step S72: NO), the controller 11 proceeds to step S63, sets a flag indicating that the user authentication fails, and proceeds to step S37.

In a case where it is determined that the user authentication is successful in step S37 of FIG. 8 (step S37: YES), the controller 11 proceeds to step S38 and performs the scan permission confirmation processing. In the scan permission confirmation processing performed in step S38, the processing of step S70 to step S72 already executed in the user authentication processing in step S36 is not executed. Specifically, in step S74, the controller 11 refers to the restriction setting value of the function "scan processing" corresponding to the user whose user authentication is successful. In step S75, if the restriction setting value "restricted" is registered in the SFL database 19 for the function "scan" of the user whose user authentication is successful (step S75: YES), the controller 11 proceeds to step S73 and does not permit the start of the scan processing (pull scan). On the other hand, in a case where the restriction setting value "permitted" is registered in the SFL database 19 for the function "scan" of the user whose user authentication is successful (step S75: NO), the controller 11 proceeds to step S76 and permits the start of the pull scan.

Other Embodiments

Figure 3:
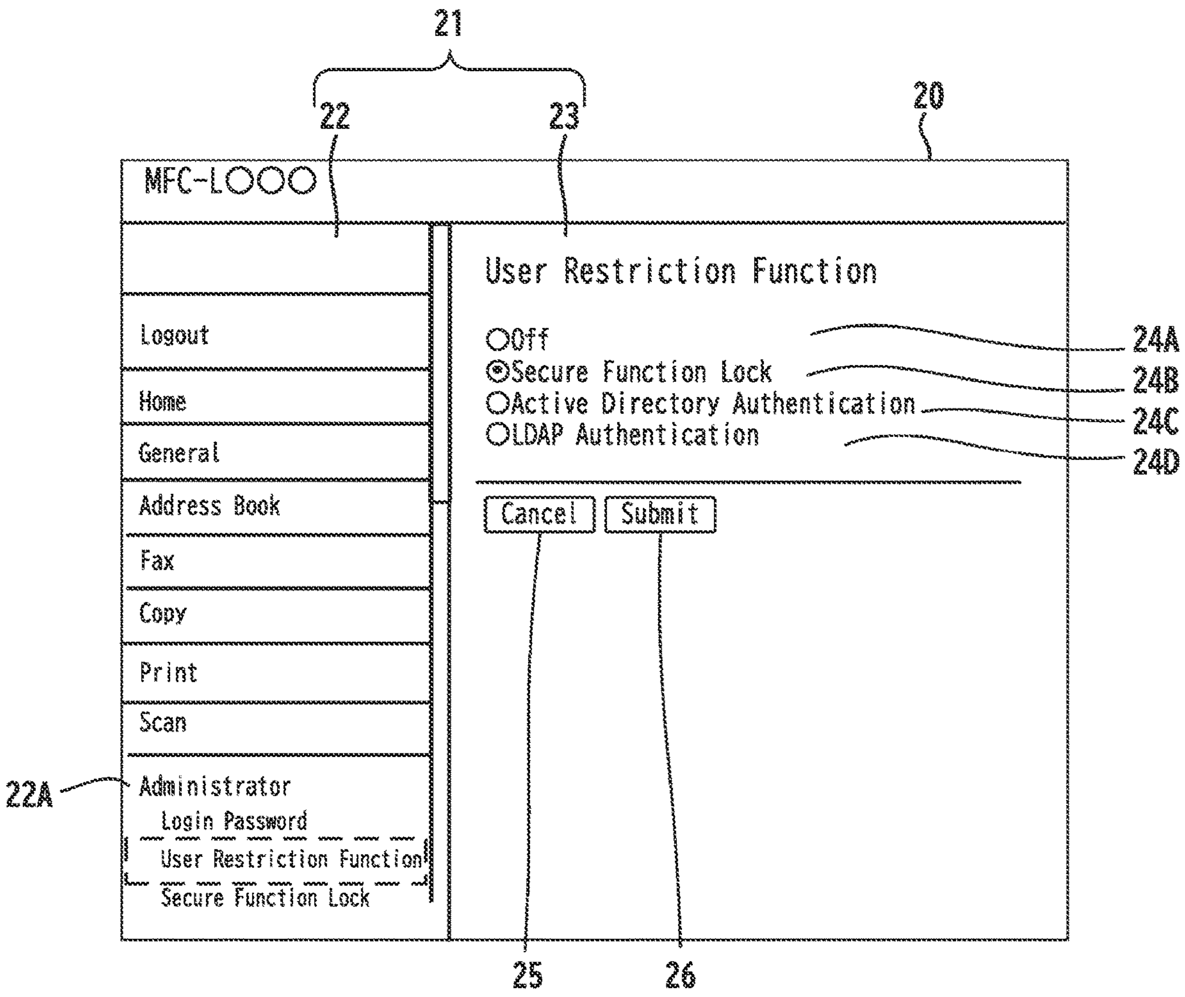
FIG. 3 shows a home screen displayed by a browser.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiment, when the "Secure Function Lock" is selected on the Web page 20 shown in FIG. 3, the restriction setting screen 30 shown in FIG. 4 is used to set a restriction setting value indicating a restriction of each function. Alternatively, when the check box 24C of the item "Active Directory Authentication" or the check box 24D of the item "LDAP Authentication" is checked on the Web page 20 shown in FIG. 3, the restriction setting screen 30 shown in FIG. 4 may be used to set a restriction setting value indicating a restriction on each function, and the processing shown in FIGS. 6 to 11 may be executed. In a case where the check box 24C is checked and the "Active Directory Authentication" is valid, the controller 11 may perform login authentication to the MFP 10 based on authentication information stored in an Active Directory (registered trademark) server. In addition, the controller 11 may store the restriction setting value in the Active Directory server and use the restriction setting value in the processing of FIGS. 6 to 11. In a case where the check box 24D is checked and the "LDAP Authentication" is valid, the controller 11 may perform login authentication to the MFP 10 based on authentication information stored in an LDAP (abbreviation of lightweight directory access protocol) server. In addition, the controller 11 may store the restriction setting value in the LDAP server and use the restriction setting value in the processing of FIGS. 6 to 11. The authentication information and the restriction setting value may be stored in different storage units. For example, the controller 11 may perform the login authentication to the MFP 10 based on the authentication information stored in the server, store the restriction setting value in the SFL database 19 of the memory 12, and use the restriction setting value in the processing of FIGS. 6 to 11.

In the above-described embodiment, the restriction setting value for the function "SFL" is set using the Web page (home screen 20) transmitted from the controller 11 of the MFP 10. Alternatively, the restriction setting value for the function "SFL" may be set by operating the user IF 16 of the MFP 10.

Although the MFP 10 has been described as an example of the reading apparatus, the reading apparatus may be an apparatus capable of executing only the function "scanner".

What is claimed is:

1. A reading apparatus comprising:
a user interface;
a scanner; and
a controller configured to perform:
a push scan that causes the scanner to read a document according to an execution instruction corresponding to an operation on the user interface; and
a pull scan that causes the scanner to read the document according to an execution instruction from an external device,
wherein the controller is configured to:
set a restriction setting value relating to a restriction on the push scan; and
in a case where the controller receives an execution instruction of the push scan via the user interface, restrict the push scan according to the restriction setting value,
in a case where the controller receives an execution instruction of the pull scan from the external device, the controller is configured to specify whether authentication is necessary with respect to the execution instruction of the push scan, based on the restriction setting value, and
in a case where the controller receives the execution instruction of the pull scan and it is specified that the authentication is necessary, in a logged-in state where a user logs into the reading apparatus, the controller is configured to:
perform the pull scan, in a case where a condition for successful authentication with respect to the execution instruction of the pull scan is satisfied and a user indicated by user information included in the execution instruction of the pull scan matches the user who logs into the reading apparatus; and
restrict the pull scan, in a case where the condition for successful authentication with respect to the execution instruction of the pull scan is satisfied and the user indicated by the user information included in the execution instruction of the pull scan does not match the user who logs into the reading apparatus.

2. The reading apparatus according to claim 1,
wherein the controller is configured to:
set the restriction setting value in association with each user; and
set the restriction setting value in association with a logged-out state where a user does not log into the reading apparatus, and
the controller is configured to, in the logged-in state:
restrict the push scan according to the restriction setting value, in a case where the restriction setting value indicates that the push scan is restricted for a user who logs into the reading apparatus, and
not restrict the push scan according to the restriction setting value, in a case where the restriction setting value does not indicate that the push scan is restricted for the user who logs into the reading apparatus, and
the controller is configured to, in the logged-out state:
restrict the push scan according to the restriction setting value, in a case where the restriction setting value indicates that the push scan in the logged-out state is restricted, and
not restrict the push scan according to the restriction setting value, in a case where the restriction setting value does not indicate that the push scan in the logged-out state is restricted, and
in a case where the controller receives the execution instruction of the pull scan from the external device, the controller is configured to:

specify that the authentication is necessary, in a case where the restriction setting value indicates that the push scan in the logged-out state is restricted; and specify that the authentication is unnecessary, in a case where the restriction setting value does not indicate that the push scan in the logged-out state is restricted.

3. The reading apparatus according to claim 2, wherein the controller is configured to receive the execution instruction of the pull scan from the external device, in the logged-in state and in the logged-out state, in a case where the controller receives the execution instruction of the pull scan from the external device in the logged-in state and it is specified that the authentication is necessary, the controller is configured to:

perform the pull scan, in a case where the condition for successful authentication is satisfied and the user indicated by the user information matches a user who logs into the reading apparatus; and restrict the pull scan even, in a case where the condition for successful authentication is satisfied and the user indicated by the user information does not match the user who logs into the reading apparatus, and in a case where the controller receives the execution instruction of the pull scan from the external device in the logged-out state and it is specified that the authentication is necessary, the controller is configured to perform the pull scan without requiring the user indicated by the user information to match the user who logs into the reading apparatus, in a case where the condition for successful authentication is satisfied.

4. The reading apparatus according to claim 2, wherein the controller is configured to:

receive the execution instruction of the pull scan from the external device, in the logged-in state and in the logged-out state; and in a case where the controller receives the execution instruction of the pull scan in the logged-in state and the user indicated by the user information matches a user who logs into the reading apparatus, the controller is configured to:

perform the pull scan, in a case where the condition for successful authentication is satisfied and the restriction setting value does not indicate that the push scan of the user who logs into the reading apparatus is restricted; and restrict the pull scan, in a case where the condition for successful authentication is satisfied and the restriction setting value indicates that the push scan of the user who logs into the reading apparatus is restricted.

5. The reading apparatus according to claim 4, wherein a first pull scan instruction from the external device does not include the user information, and the controller is configured to:

in a case where it is specified that the authentication is necessary for the execution instruction of the pull scan, request an execution instruction of a next pull scan including the user information from the external device; and perform the authentication, based on the user information included in the execution instruction of the next pull scan.

6. A reading apparatus comprising:

a user interface;

a scanner; and a controller configured to:

perform a push scan that causes the scanner to read a document according to an execution instruction corresponding to an operation on the user interface; and a pull scan that causes the scanner to read the document according to an execution instruction from an external device, wherein the controller is configured to:

set a restriction setting value relating to a restriction on the push scan; and in a case where the controller receives an execution instruction of the push scan via the user interface, restrict the push scan according to the restriction setting value, in a case where the controller receives an execution instruction of the pull scan from the external device, the controller is configured to specify whether authentication is necessary, based on the restriction setting value, in a case where it is specified that the authentication is unnecessary, the controller is configured to perform the pull scan without the authentication, and in a case where it is specified that the authentication is necessary, the controller is configured to:

perform the pull scan, in a case where the authentication is successful; and not perform the pull scan, in a case where the authentication is failed.

7. The reading apparatus according to claim 6, wherein the controller is configured to:

set the restriction setting value in association with each user; and set the restriction setting value in association with a logged-out state where a user does not log into the reading apparatus, and the controller is configured to, in a logged-in state where a user logs into the reading apparatus:

restrict the push scan according to the restriction setting value, in a case where the restriction setting value indicates that the push scan is restricted for a user who logs into the reading apparatus; and not restrict the push scan according to the restriction setting value, in a case where the restriction setting value does not indicate that the push scan is restricted for the user who logs into the reading apparatus, and the controller is configured to, in the logged-out state:

restrict the push scan according to the restriction setting value, in a case where the restriction setting value indicates that the push scan in the logged-out state is restricted; and not restrict the push scan according to the restriction setting value, in a case where the restriction setting value does not indicate that the push scan in the logged-out state is restricted, and in a case where the controller receives the execution instruction of the pull scan from the external device, the controller is configured to:

specify that the authentication is necessary, in a case where the restriction setting value indicates that the push scan in the logged-out state is restricted; and specify that the authentication is unnecessary, in a case where the restriction setting value does not indicate that the push scan in the logged-out state is restricted.

8. The reading apparatus according to claim 7, wherein in a case where the controller receives the execution instruction of the pull scan from the external device, in the logged-in state and in the logged-out state, the controller is configured to:

specify that the authentication is necessary, in a case where the restriction setting value indicates that the push scan in the logged-out state is restricted; and specify that the authentication is unnecessary, in a case where the restriction setting value does not indicate that the push scan in the logged-out state is restricted.

9. The reading apparatus according to claim 8, wherein in a case where the controller receives the execution instruction of the pull scan in the logged-in state, and the restriction setting value indicates that the push scan in the logged-out state is restricted and it is specified that the authentication is necessary, the controller is configured to:

perform the pull scan, in a case where a condition for successful authentication is satisfied and the restriction setting value does not indicate that the push scan of the user who logs into the reading apparatus is restricted; and restrict the pull scan, in a case where the condition for successful authentication is satisfied and the restriction setting value indicates that the push scan of the user who logs into the reading apparatus is restricted.

10. The reading apparatus according to claim 6, wherein the controller is configured to set the restriction setting value in association with each user, the controller is configured to perform the authentication, based on user information included in the execution instruction of the pull scan, and in a case where the controller receives the execution instruction of the pull scan from the external device and it is specified that the authentication is necessary, the controller is configured to:

perform the pull scan, in a case where a condition for successful authentication is satisfied and the restriction setting value does not indicate that the push scan is restricted for a user indicated by the user information; and restrict the pull scan, in a case where the condition for successful authentication is satisfied and the restriction setting value indicates that the push scan is restricted for the user indicated by the user information.

11. The reading apparatus according to claim 10, wherein a first pull scan instruction from the external device does not include the user information, and the controller is configured to:

in a case where it is specified that the authentication is necessary for the execution instruction of the pull scan, request an execution instruction of a next pull scan including the user information from the external device; and perform the authentication, based on the user information included in the execution instruction of the next pull scan.

12. A reading apparatus comprising:

a user interface;

a scanner; and a controller configured to perform a scan that causes the scanner to read a document according to an execution instruction, wherein, in a case where the controller receives an execution instruction of the scan, the controller is configured to restrict the scan according to a restriction setting value, and in a case where a restriction setting value corresponding to restricting the scan is set and the controller receives an execution instruction of a pull scan from an external device, the execution instruction being the execution instruction of the scan, the controller is configured to: perform authentication and, in a case where the authentication is successful, perform the pull scan; and perform authentication and, in a case where the authentication is failed, restrict the pull scan, and in a case where the restriction setting value corresponding to restricting the scan is set and the controller receives an execution instruction of a push scan, the controller is configured to restrict the push scan without performing the authentication, the execution instruction being the execution instruction of the scan according to an operation on the user interface.

* * * * *